(12) United States Patent
Kim et al.

(10) Patent No.: US 11,204,509 B2
(45) Date of Patent: Dec. 21, 2021

(54) ULTRALIGHT VERY LARGE APERTURE SPACE TELESCOPE AND METHODS USING MODE LENSES AND SHIMS

(71) Applicant: Arizona Board Of Regents On Behalf of the University of Arizona, Tucson, AZ (US)

(72) Inventors: Dae Wook Kim, Tucson, AZ (US); Rongguang Liang, Tucson, AZ (US); Oliver Spires, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 0 days.

(21) Appl. No.: 17/290,163

(22) PCT Filed: Oct. 30, 2019

(86) PCT No.: PCT/US2019/058815
§ 371 (c)(1),
(2) Date: Apr. 29, 2021

(87) PCT Pub. No.: WO2020/092529
PCT Pub. Date: May 7, 2020

(65) Prior Publication Data
US 2021/0318550 A1 Oct. 14, 2021

Related U.S. Application Data

(60) Provisional application No. 62/752,745, filed on Oct. 30, 2018, provisional application No. 62/752,843, filed on Oct. 30, 2018.

(51) Int. Cl.
*G02B 5/18* (2006.01)
*G02B 27/36* (2006.01)
*G02B 27/42* (2006.01)

(52) U.S. Cl.
CPC ......... *G02B 27/36* (2013.01); *G02B 27/4255* (2013.01)

(58) Field of Classification Search
CPC ... G02B 7/00; G02B 7/02; G02B 7/32; G02B 7/42; G02B 7/36; G02B 7/4255;
(Continued)

(56) References Cited

U.S. PATENT DOCUMENTS 4,846,554 A 7/1989 Mori et al.
5,886,837 A 3/1999 Legare et al.
(Continued)

OTHER PUBLICATIONS

Early et al. (Twenty meter space telescope based on diffractive Fresnel lens, SPIE Proc, 5166, pp. 148-156, 2003) (Year: 2003).*
(Continued)

*Primary Examiner* — Stephone B Allen
*Assistant Examiner* — Jyotsna V Dabbi
(74) *Attorney, Agent, or Firm* — Smith, Gambrell & Russell LLP

(57) ABSTRACT

A kinematically engaged yoke system (KEYS) for multiple-order-diffraction engineered material may comprise a harness comprising a frame and a plurality of semi-kinematic keys disposed on the frame, wherein the semi-kinematic keys are configured based on a MOD-side mechanical profile of a plurality of segments of a multiple-order-diffraction engineered material, and wherein the MOD-side mechanical profile, when engaged with the semi-kinematic keys, functions as a fiducial that provides alignment between neighboring segments; and one or more shims disposed between one or more pairs of neighboring segments of the plurality of segments of the multiple-order-diffraction engineered material, wherein the one or more shims facilitate alignment of the one or more pairs of neighboring segments
(Continued)

of the plurality of segments based on a translation across one or more surfaces of the one or more shims.

20 Claims, 17 Drawing Sheets

(58) Field of Classification Search
CPC ...... G02B 7/4233; G02B 7/4272; G02B 7/44; G02B 7/4205; G02B 7/4211; G02B 7/4216; G02B 7/1086; G02B 7/0025; G02B 7/0037; G02B 7/005; G02B 7/0056; G02B 23/00; G02B 23/16; G02B 5/1876; G02B 5/1866; G02B 5/18; G02B 5/188; G02B 5/1885; G02B 5/1819; G02B 5/1814; G02B 5/189; G02B 2005/1804; G02B 3/006; G02B 3/0037; G02B 3/08
USPC .................................................. 359/566, 892
See application file for complete search history.

(56) References Cited

U.S. PATENT DOCUMENTS 6,141,034 A     10/2000   Mccutchen
9,335,563 B2 *  5/2016    Weeber ................ G02C 7/041
2006/0028746 A1 * 2/2006  Niwa .................... G03B 11/00
                                                      359/892
2017/0017164 A1  1/2017   Zeiss
2017/0235153 A1  8/2017   Thales

OTHER PUBLICATIONS

Kim et al. (Advances in optical engineering for future telescope, Opto-Electronic Advances, vol. 4, No. 6, 2100040, 2021) (Year: 2021).*
Milster et al. (Multiple-order diffractive engineered surface lenses, Applied Optics, vol. 59, No. 26, Sep. 10, 2020, pp. 7900-7906) (Year: 2020).*
Johnson et al. (Multiple-Order Diffractive Fresnel Lens MOD-DFL for Atmospheric Transit Surveying of Earthlike Exoplanets, Design and Fabrication Congress, 2017, pp. 1-2) (Year: 2017).*
Apai (Nautilus, Astro2020 White Paper, pp. 1-13, nautilus-array. space) (Year: 2020).*
Faklis (Spectral properties of multi-order diffractive lenses, Applied Optics, vol. 34, No. 14, May 10, 1995, pp. 2462-2468) (Year: 1995).*
Apai et al.; "Nautilus Deep Space Bservatory: A Giant Segmented Space Telescope Array for a Galactic Biosignature Survey"; Deep Space Gateway Concept Science Workshop; vol. 2063; Feb. 2018; retreived from https://ui.adsabs.harvard.edu/abs/2018LPICo2063.3127A/abstract.
International Search Report and Written Opinion dated Jan. 24, 2020 for Application No. PCT/US19/058815; 16 pages.

* cited by examiner

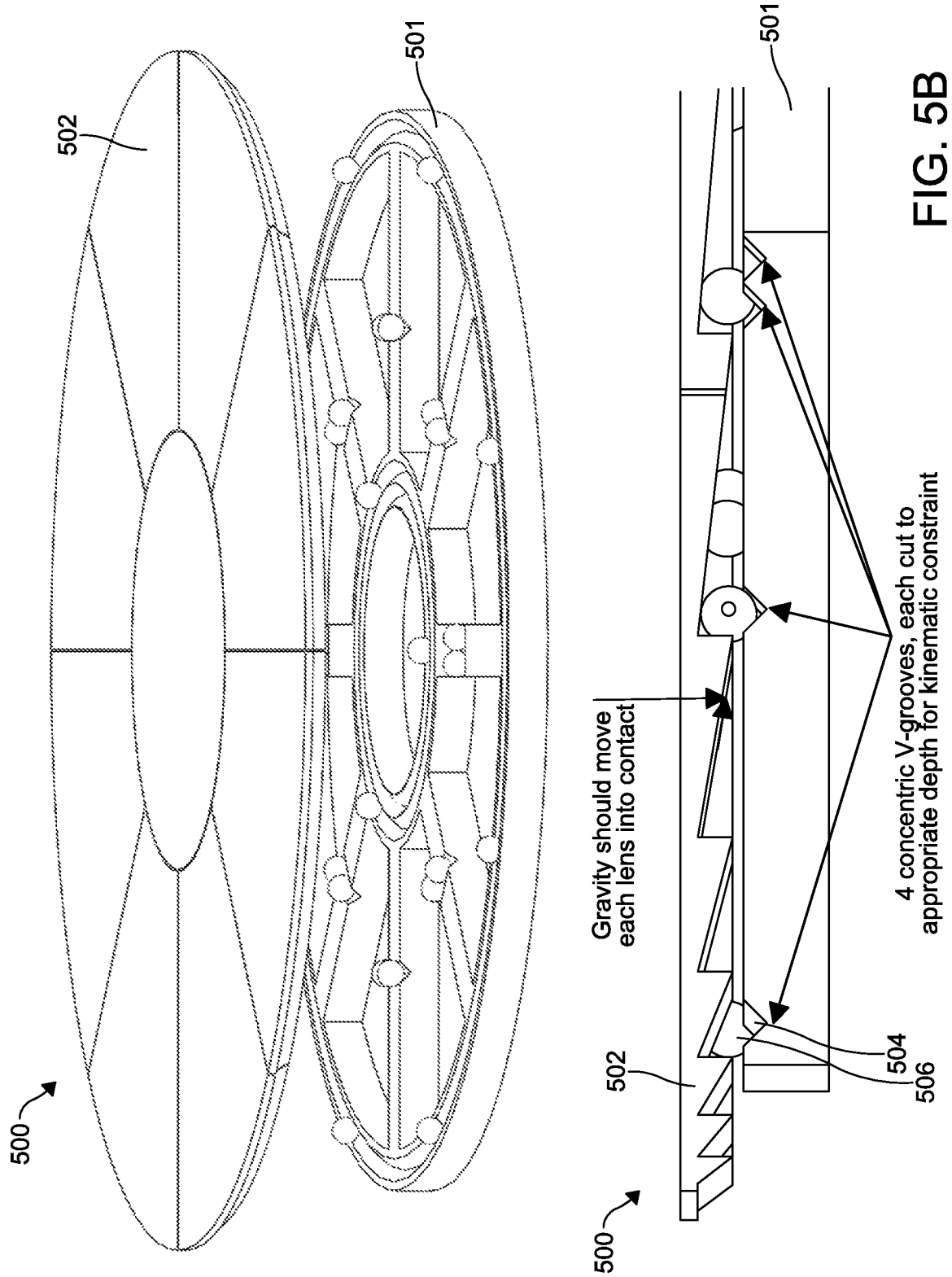

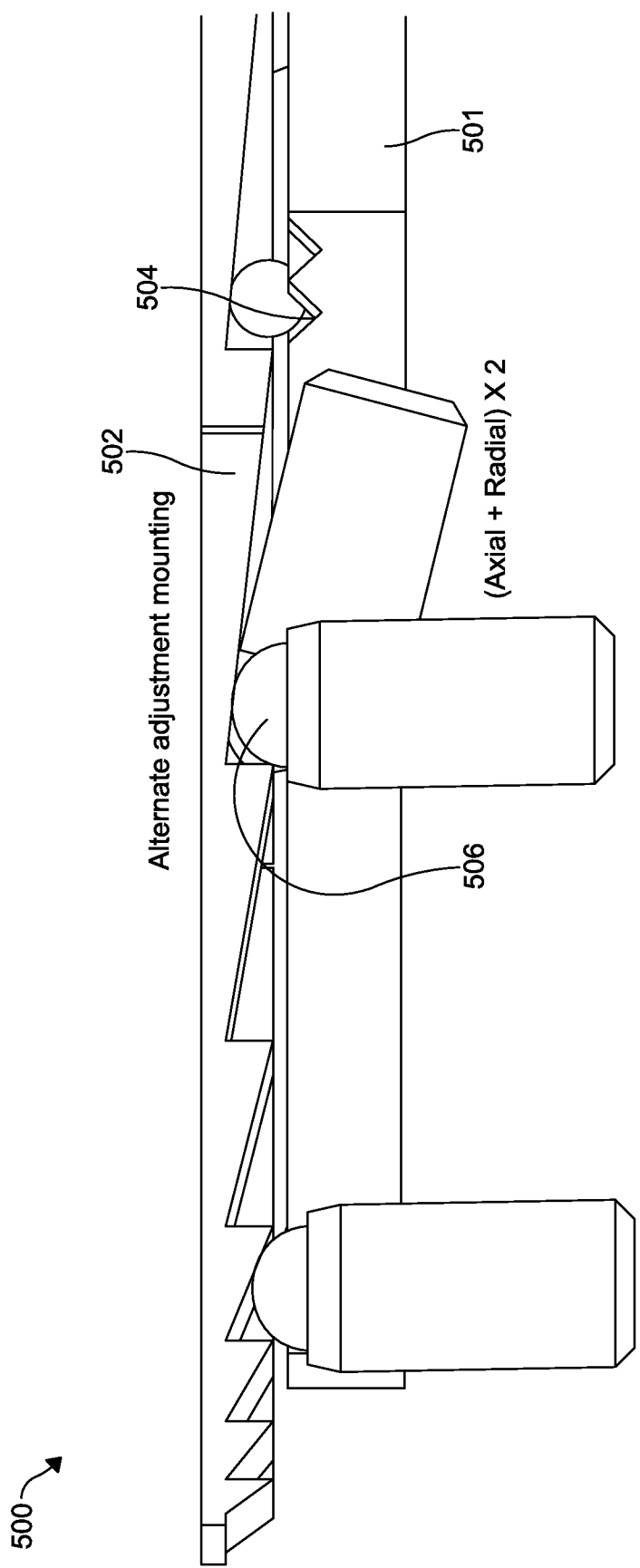

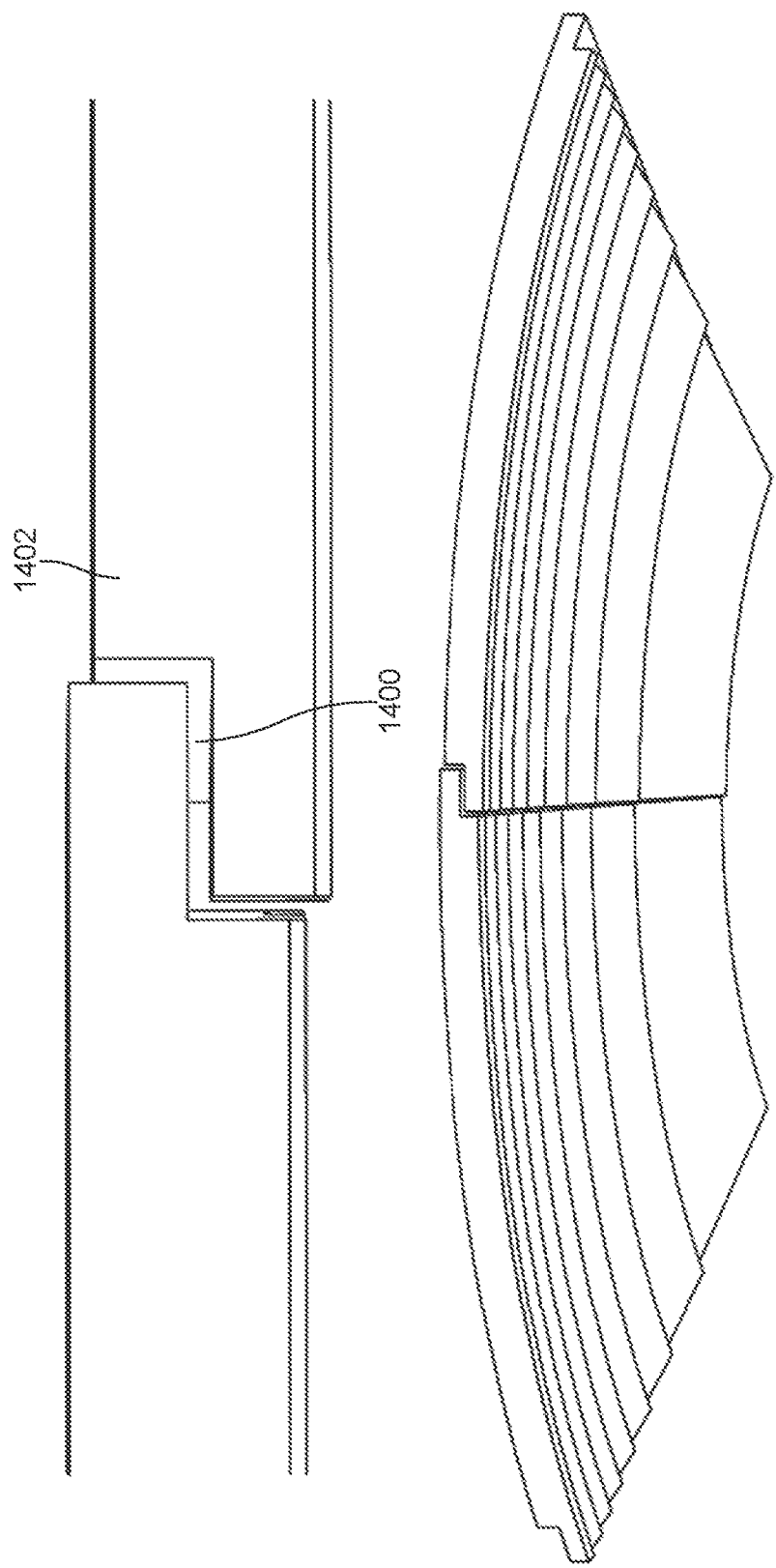

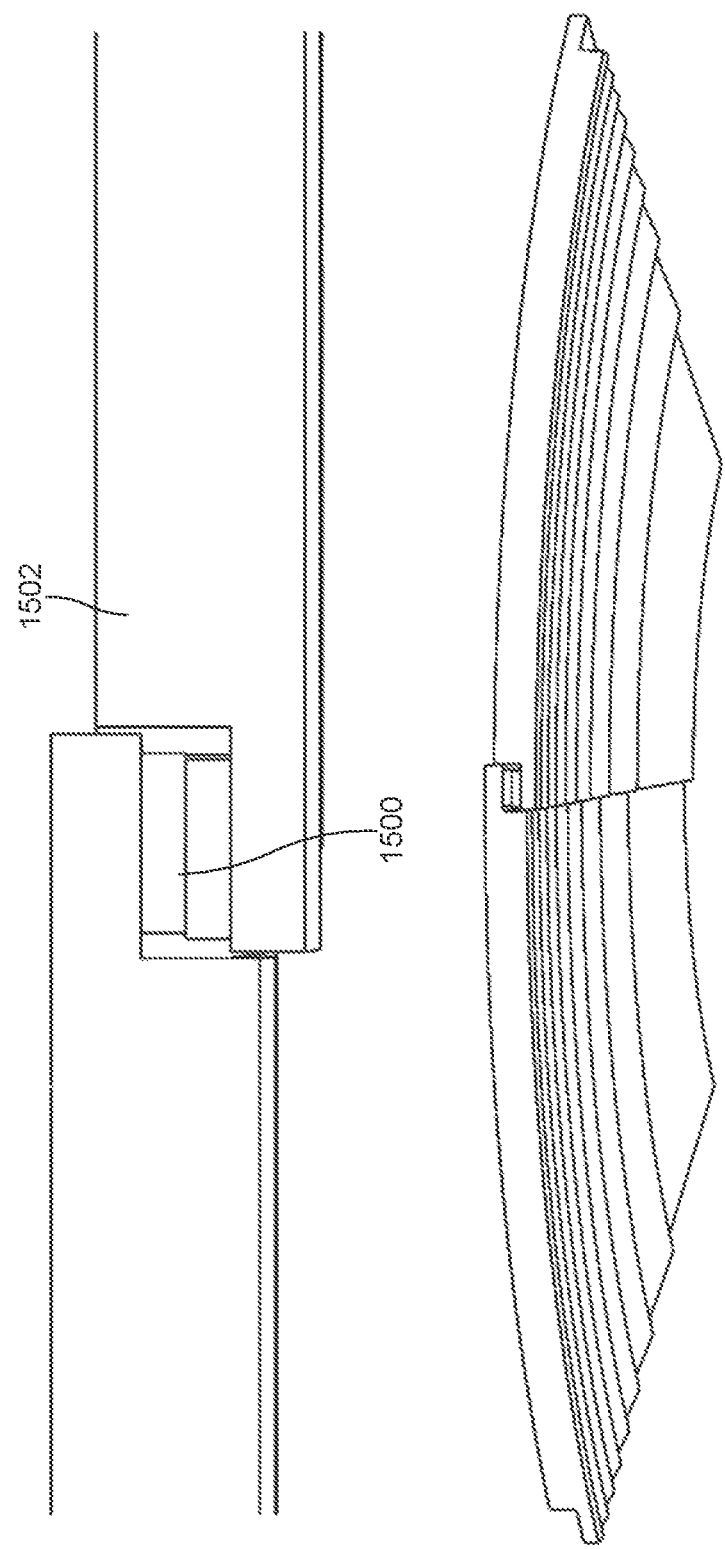

ULTRALIGHT VERY LARGE APERTURE SPACE TELESCOPE AND METHODS USING MODE LENSES AND SHIMS

CROSS-REFERENCE TO RELATED APPLICATIONS

This application is a National Stage Application of International Application No. PCT/US2019/058815, filed Oct. 30, 2019, which claims the benefit of U.S. Provisional Application No. 62/752,745, filed Oct. 30, 2018, and U.S. Provisional Application No. 62/752,843, filed Oct. 30, 2018, each of which are hereby incorporated by reference in their entirety.

FIELD

Exemplary embodiments of the present disclosure relate generally to methods, and apparatuses for a paradigm-shifting space telescope enabled by multiple-order-diffraction engineered material (MODE) lenses.

BACKGROUND

Improvements in space telescope technology are needed. For example, mirror systems may be heavy, costly, and may comprise transmission loss and reduction in light throughput due to obscurations. Also, segmented mirror system has very sensitive alignment and assembly tolerance, which increases the overall system complexity and budget.

SUMMARY

Exemplary embodiments are provided that demonstrate a paradigm-shifting space telescope technology enabled by multiple-order-diffraction engineered material (MODE) lenses. MODE lenses are ultralightweight, transmissive, and fabricated economically by compression-molding very large aperture lenses directly or by molding segments that are assembled into large apertures. For example, with MODE lens technology, a 6.2-m aperture primary lens can potentially be assembled using only nine unique 0.5m-class mold segments for a total mass of only 125 kg. In future space missions, MODE-based optics will replace mirror systems to provide: 1) lighter weight; 2) lower cost for a given aperture size; and 3) higher transmission due to the unobscured optical path of MODE lenses. Preliminary plastic MODE components have been successfully constructed and tested. The proposed next step is a directed project to establish a credible demonstration with glass MODE lenses for space telescopes. The centerpiece of the work described here is the design, fabrication, and testing of a diffraction-limited, 0.24-m diameter aperture, nine-segment (two mold) MODE-lens telescope that is optimized for the astronomical R-band wavelength range. A strong project team of experienced and complementary researchers will execute the work plan to significantly expand the boundary of knowledge in optical system theory, design, and fabrication technology for diffractive optics-based space telescopes. The work will mostly be accomplished using in-house fabrication and testing equipment. On-sky testing will take place at an observatory with a MODE telescope piggybacked onto a 61" astronomical telescope to benchmark and serve as a reference for the MODE telescope measurements. The successful demonstration of low-cost, low-weight, scalable MODE technology will revolutionize space telescopes and through that, astrophysical and Earth observations. The extension to fabrication of larger apertures is discussed in some detail, which includes a preliminary plan for producing up to 5-m diameter monolithic molds and lenses. A segmented-mold concept is presented for producing up to 5-m monolithic lenses, which could also be used to produce 5-m segments for future ultra-large aperture telescopes. Survivability in space environments and design for large bandwidth, other uses for MODE lenses, and a pathway for large-aperture MODE lens space telescopes are also discussed.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems.

FIGS. 5A, 5B, and 5C show schematic diagrams illustrating a Kinematically Engaged Yoke System (KEYS) with MODE primary segments according to an exemplary embodiment of the present disclosure, which is a uniquely designed and manufactured mechanical alignment and locking structure, co-phasing and aligning the segments using the precise surface profiles of the MOD-side of the MODE lens. The KEYS base structure has concentric V-grooves, which are precisely manufactured circular datum surfaces to match the MOD transition step azimuthal arc profile. The radial direction alignment between the MODE segments and the KEYS structure may be achieved by ball contacts with the transition steps. The co-phasing between segments may be achieved by three ball contacts on the MOD-side surface of each segment to avoid over constraining, for example. Other contacts and number of contacts may be used. AS an illustrative example, the semi-kinematic mounting points will be made with high-precision balls embedded in the V-grooves of the KEYS structure. Each MODE segment's 5 degrees of freedom may be confined for the subsequent welding process, except the rotation about the center of the MODE primary lens optical axis. If the as-manufactured KEYS do not provide sufficient alignment accuracy, as a backup plan, the balls can be replaced with precision adjustment screws with sub-micron sensitivity.

FIGS. 14-15 are diagrams illustrating MODE segments aligned by a notch configuration that introduces complexity.

DETAILED DESCRIPTION OF ILLUSTRATIVE EMBODIMENTS

Figure 1:
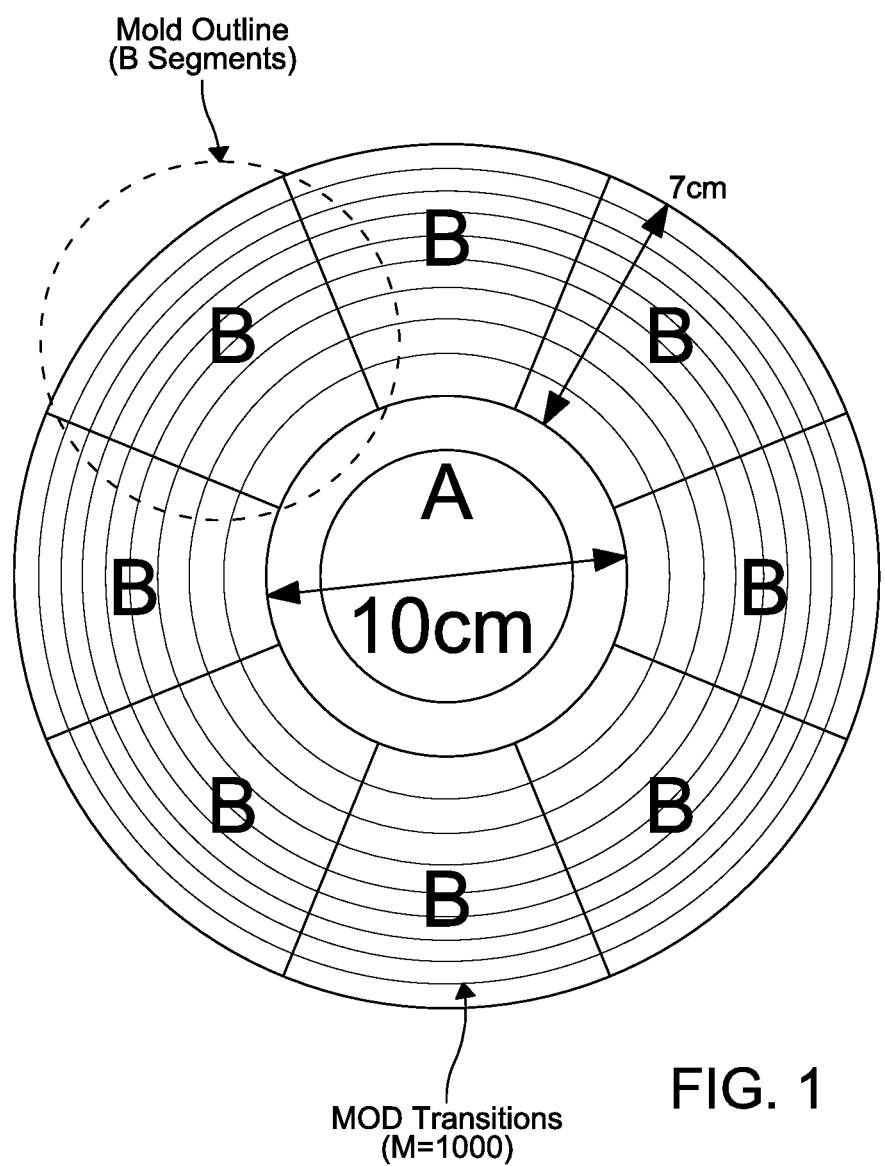
FIG. 1 is a diagram illustrating segments and transitions of an aperture system according to an exemplary embodiment of the present disclosure, showing segments and transitions of a 0.24 m aperture, f=1 m MODE lens designed for R-band wavelengths.
Figure 2:
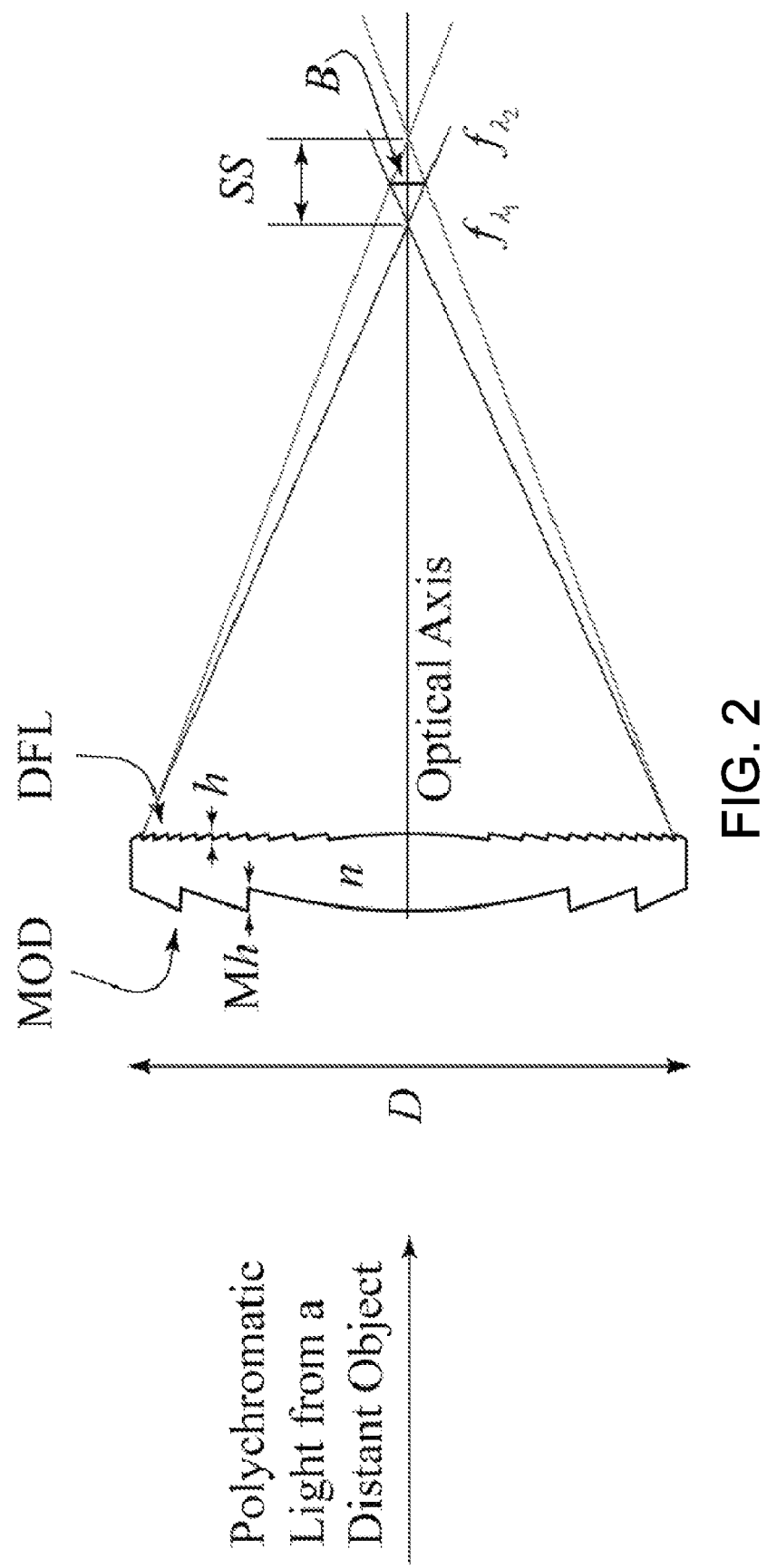
FIG. 2 is a diagram illustrating a profile sketch of a MODE lens according to an exemplary embodiment of the present disclosure, showing a profile sketch of a MODE lens focusing polychromatic light from a distant object (not to scale). The front surface is a multiple-order diffractive (MOD) profile, and the back surface is a single-harmonic diffractive Fresnel lens (DFL). Wavelengths focus at different distances behind the MODE lens, which creates a secondary spectrum (SS) of the focal range. The minimum blur circle diameter of this range is B.
Figure 3:
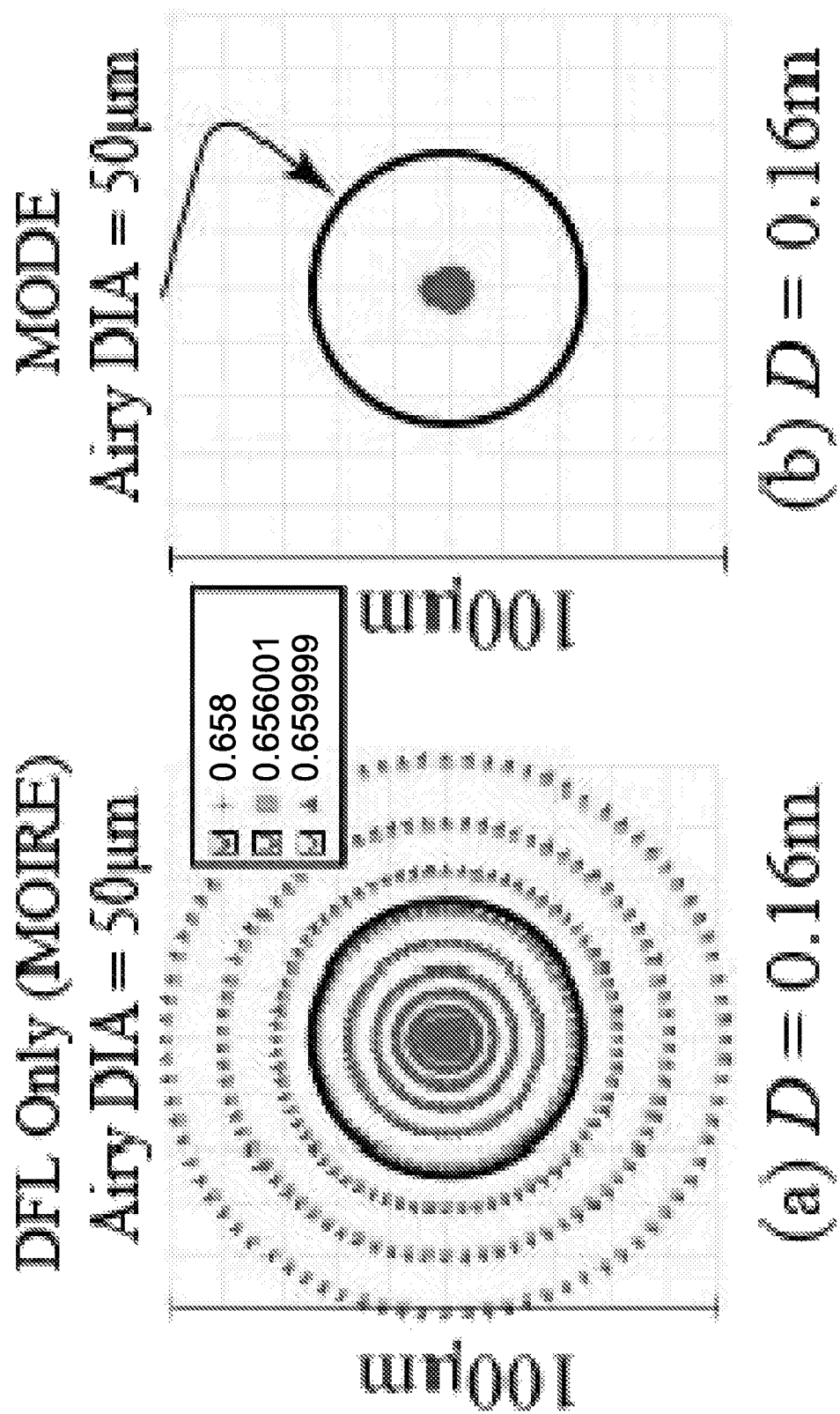
FIG. 3 is a diagram illustrating a comparison between a color-corrected DFL telescope and the MODE-lens telescope over a small light bandwidth according to an exemplary embodiment of the present disclosure, showing a comparison of spot sizes for different simplified telescope technologies in a 2 nm band around the central R-band wavelength of 658 nm. The black circle in each case is the diffraction-limited Airy spot diameter. (a) DFL-only lenses in a 0.16 m aperture telescope cannot produce diffraction-limited performance due to large SS of the primary lens; and (b) MODE lenses in a 0.16 m aperture telescope produce perfect diffraction-limited performance due to the dramatically smaller SS of the primary lens.

Some embodiments of the present disclosure will now be described more fully hereinafter with reference to the accompanying drawings, in which some, but not all embodiments of the present disclosure are shown. Indeed, various embodiments of the present disclosure may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present disclosure. Moreover, the term "exemplary", as used herein, is not provided to convey any qualitative assessment, but instead merely to convey an illustration of an example. Thus, use of any such terms should not be taken to limit the spirit and scope of embodiments of the present disclosure.

It is to be understood that the methods and systems described herein are not limited to specific methods, specific components, or to particular implementations. It is also to be understood that the terminology used herein is for the purpose of describing particular embodiments only and is not intended to be limiting.

Aperture diameter may be considered a fundamental parameter of a telescope. Since larger diameter apertures collect more light and increase resolution, engineers and scientists continue to push for larger diameter (D) space telescopes. Yet, progress toward large space telescopes remains slow. Existing technologies (Table 1 below, Mirror technology) use mirror-based optical telescope assemblies, which exhibit a broad spectral response and are made from stable materials such as glass or beryllium. Due to increased launch weight and other factors, these telescopes rapidly increase system cost at approximately $D^{1.7}$. Mirror surfaces require tight tolerances of typically $0.01\lambda$, rms surface roughness. In addition, the secondary mirror, which folds the optical path and improves field performance, obstructs a considerable amount of the telescope aperture and reduces the system's light throughput. Lower throughput means less efficiency in gathering light from faint sources, such as distant galaxies or extrasolar planets.

Ultralightweight, large-aperture transmissive telescopes can potentially overcome many of the limitations of mirror-based systems for astronomical applications. Contemporary technology developments include the MOIRE 5-m primary lens (Table 1 below, MOIRE technology) made from a flexible thin-film polymer; however, this solution proved difficult to manage mechanically. In addition, the MOIRE demonstration system was limited to a 40-nm light bandwidth.

The present disclosure relates to a new paradigm in space telescope technology that may overcome these difficulties. The new type of ultralightweight optical element is called a multiple-order-diffraction engineered material (MODE) lens. Unlike the MOIRE polymer primary lens, the ultralightweight MODE lens is capable of operating over broader light bandwidths and is made from stable optical materials. Unlike mirror systems, it does not have an obscured aperture. Design and simulation for the MODE lens concept has been conducted and constructed small-aperture MODE lenses from plastic materials by direct diamond turning. Demonstrating a complete apochromatic, diffraction-limited, stable, glass-based telescope is the focus of the proposed project, by combining MODE segments that ultimately can lead to very large apertures (>6 m). Also, the replication of MODE lens segments may be demonstrated by compression molding for substantial cost savings. The present disclosure may demonstrate MODE lens fabrication that can be applied to large (>6 m) apertures; and demonstrate the replication of high-quality glass-based MODE lenses.

A large-aperture, thin, transmissive MODE lens may be the primary focusing element in the telescope. The MODE lens concept may combine both refractive and diffractive optical element (DOE) technologies. Other technologies may be used. Refractive telescope technology is well established for space telescopes. DOE technology, which uses thin elements that perform lens-like functions, is less well established, but there are recent examples at high TRL either flown on space missions as small-scale internal optics or planned for flight in the near-term. One example is the Lunar Orbiter Laser Altimeter (LOLA) mission that uses a glass DOE as a beam splitter to divide a single laser beam into five copies. NASA's WFIRST space telescope uses a grism assembly with two complicated DOEs that are combinations of linear gratings, diffractive Fresnel lenses (DFLs), and aberration-correction components. The NASA James Webb Space Telescope (JWST)'s NIRISS instrument uses a grism with a linear-grating DOE made from ZnSe. Diffractive optics are also available on a commercial scale. For example, Canon's high-quality EF telephoto zoom lenses incorporate two or three diffractive optical surfaces, which are first diamond turned in a mold and then replicated onto a curved glass substrate with epoxy resins. Given that DOEs are increasingly replacing mirrors/lenses in applications where low weight, low cost, and high optical quality are all essential, it is reasonable to expect that new types of DOEs, such as MODE lenses, will soon be fabricated at low cost and flown in space.

Several large-aperture DOE space telescope concepts have been discussed that use DFL primary optics, including the MOIRE and Eyeglass technologies, with reported ground-based demonstrations of portions of these systems. The MOIRE telescope DFL is an example of a DOE that acts like a focusing lens. Due to a dramatic change in focus of the primary lens with wavelength, corrective optics are implemented near the focus of the primary DFL. A ground-based demonstration of the MOIRE system achieved 112 nm rms wavefront quality over a 0.45-m subaperture, with imaging performance of 2.3 on a NIIRIS scale over a 40-nm-wide spectral bandwidth. Lawrence Livermore National Laboratories studied the Eyeglass very large-aperture (~100 m) transmissive diffractive space telescope concept and demonstrated broadband (470-700 nm) imaging. A 5-m-diameter segmented (72 panels) prototype was built and successfully tested. While extrapolations suggest 2-3 orders of magnitude lower weight per area than HST's mirror, to achieve high quality imaging these systems must rely on either relatively narrow light bandwidths (40 nm for MOIRE) or extremely long focal lengths (f/100 system for Eyeglass). In effect, the primary limiting factor is the large secondary spectrum (SS) that is described in Section 3. In stark contrast, MODE lenses typically have several-thousand-times smaller SS than either the MOIRE or Eyeglass systems, and therefore can easily provide more than three times wider bandwidth (140 nm) and a relatively short primary focal length (f/4). It is noted that the possibility of using a multiple-order DOE—an important component of a MODE lens—while suggested, lacks a pursued or designed system.

An important aspect of the MOIRE, Eyeglass, and MODE telescope concepts is their extension to extremely large aperture diameters (>20 m) for Gossamer-class telescopes. In any of these three technologies, extension to large apertures requires fabricating and joining together segments into a large aperture. The segments could be folded for launch in an origami pattern or assembled in space. The technology for aligning and joining MODE lens segments into a monolithic lens—which can be applied to large apertures and can enable telescope arrays—is a significant part of the proposed research.

JWST's design employs an architecture to cool a deployable, segmented lightweight active mirror and achieve a system that both will perform optically and is capable of being launched. The proposed MODE-based telescope is a step along the evolution of space telescopes. While the MODE-based primary lens is segmented like JWST's to enable a reasonable production process, the MODE approach is far less complex because the segments are aligned and integrated into a monolith as part of the production process. In addition, by advancing molding technology to larger mold diameters, larger monolithic MODE lenses can be fabricated and larger segments can be produced.

Exemplary embodiments for demonstrating a 24-cm diameter, 1-m focal lens MODE lens system, which combines nine segments into a monolithic lens, as shown in FIG. 1, are described herein. The central A segment is 10-cm in diameter, and the outer pie-shaped B segments are 7-cm across the radius. A and B segments are fabricated as separate molded glass pieces, which are generated from two unique molds. The segment diameter is limited to about 10 cm by currently available glass molding instrumentation, but could be significantly scaled up in the future. This MODE lens has a high diameter-to-thickness aspect ratio of about 24:1. The thin lens profile and simple optical system geometry is desired for space telescopes, where total system mass is a primary cost driver.

In view of the baseline MODE technology, larger-aperture systems can be fabricated by simply adding more rings, or increasing the mold diameter. For example, adding three more rings (C, D, and E) to the layout in FIG. 1 would result in a 0.66-m aperture using five molds. As compression molding equipment is developed to fabricate larger segments (e.g., 0.5-m in diameter), a single-ring, nine-segment lens (two molds) would have a 1.2-m aperture, whereas an eight-ring lens (nine molds) would have a 6.2-m diameter aperture, which is approximately the size of the JWST primary. Section 4 discusses options for fabricating monolithic singlets up to 5 m in diameter and larger telescopes using 5-m diameter segments. It is noted that fabrication up to 0.6-m diameter does not require the development of new diamond turning tools; it only requires engineering of new molding and handling equipment. There are several key technology elements addressed herein using 0.1-m molding equipment. Areal mass density estimates for MODE optics reflect a range from approximately 4 to 20 kg/m², depending on the depth of the multiple-order-diffractive (MOD) transitions and substrate thickness.

Figures 4A, 4B:
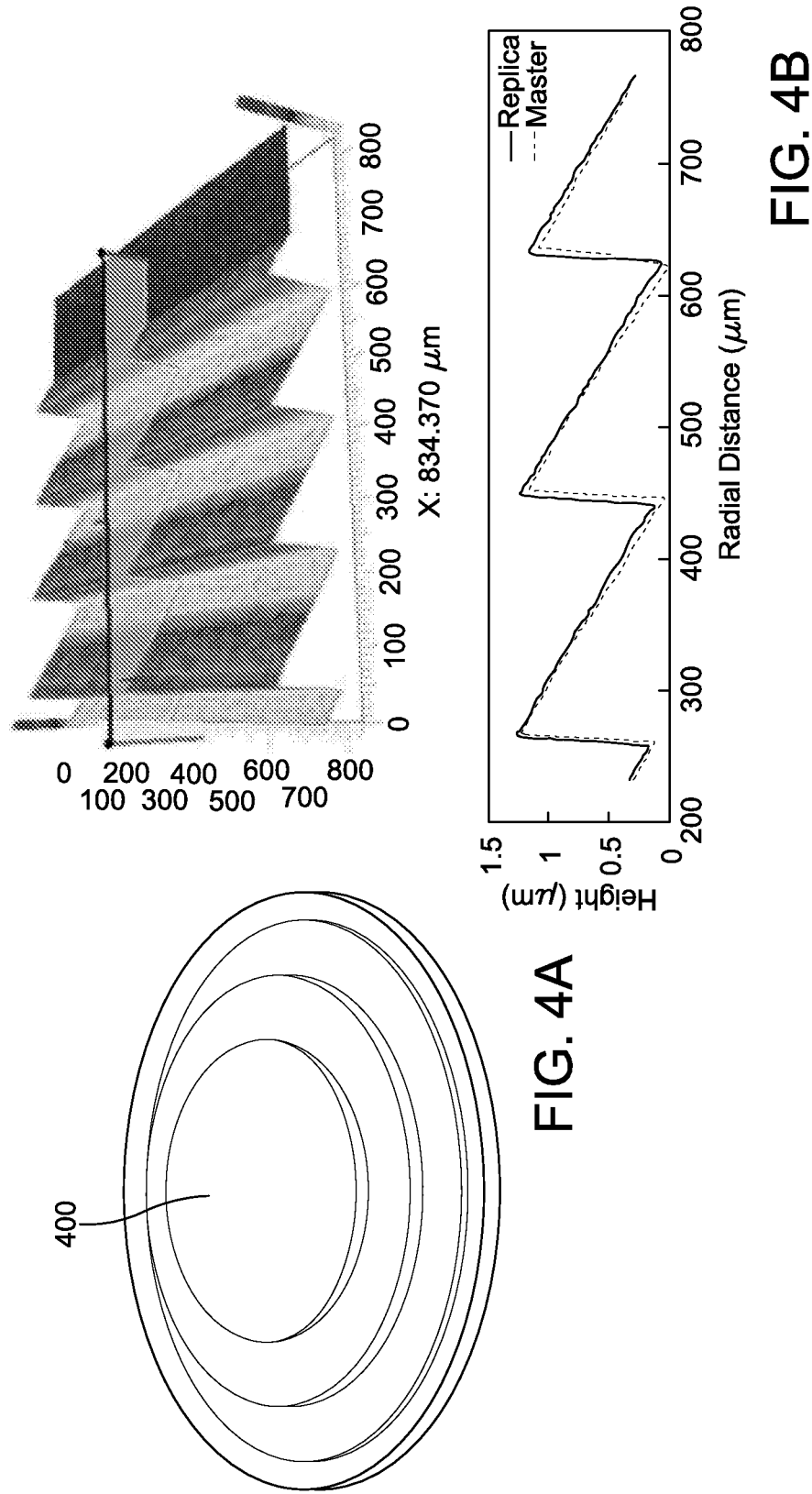
FIG. 4 is a diagram illustrating an example plastic MODE lens and DFL back surface fabricated with this replication technique according to an exemplary embodiment of the present disclosure, showing (a) Direct-diamond turned MODE lens front surface in PMMA; and (b) DFL back surface fabricated with replication into NOA61.

MODE technology combines several principles of optical design. The behavior of a MODE lens exhibits characteristics of a lens and new characteristics due to its multiple-harmonic and diffractive surface structures. A profile sketch of a MODE lens is shown in FIG. 4A-4B. As shown, and for example, the front surface of the MODE lens is a MOD profile—which resembles a Fresnel lens in appearance—to provide the primary focusing power of the lens. The second surface is a single-harmonic DFL, which acts to correct refractive dispersion of the glass material. The single-harmonic surface transitions of the DFL correspond to one wavelength of optical path difference at the center of the polychromatic wavelength band, and they have a height h of $$h = \frac{\lambda_0}{n_0 - 1}, \tag{1}$$

where $\lambda_0$ is the center wavelength and $n_0$ is the refractive index at the center wavelength. The MOD number M is large (>500) in order to limit differences in focal lengths over the bandwidth. For an R-band center wavelength of $\lambda_0=658$ nm using N-PK51 glass with M=1000, it is calculated that h=1.25 μm and Mh=1.25 mm.

Spectral characteristics of the MODE lens may be important to the design. The focal length of a single-harmonic DFL changes dramatically with wavelength. In fact, both the MOIRE and Eyeglass systems were proposed to use single-order (M=1) DFLs as their primary focusing elements, which required extremely difficult color compensation. As shown in FIG. 4, the SS is the maximum difference of the primary lens focal lengths over the band of wavelengths used in the telescope. The blur circle diameter (B) is the spot size diameter of the primary lens due to focal color shifts. For the MODE primary lens, SS is larger than for zero-dispersion reflective telescope systems, but much smaller than for a single-harmonic DFL—like those used in MOIRE and Eyeglass—by a factor of 1/M. The dramatically smaller SS makes the color compensation much easier.

Even though diffraction-limited performance for critical imaging tasks can be achieved with color-correction optics. A larger spot is preferred in these cases, due to radiometric complications with gaps between pixels in the camera plane. For example, a science goal of the Nautilus group is to spectroscopically investigate exoplanet atmospheres through transit studies, where a constellation of simple 5 m aperture MODE-lens telescopes with prism spectrometers and science cameras fulfills the science needs. Additional color correction is unnecessary, and the entire optical system is simply the MODE primary lens and the spectrometer. In this case, B~100 µm.

TRL evaluation may follow the NASA TRL requirements: the performance of the components will be verified through laboratory (TRL1-3) and on-sky (TRL4) measurements and model comparisons. The on-sky measurements will allow us to verify analytical model predictions for functionality as part of a telescope system in a range of operating temperatures.

Design tools include optical design programs and custom programs. The design programs are used with multi-configuration editors to individually design each ring of the MODE lens as a separate configuration. A vertex setback is used between successive configurations in order to properly account for MOD transitions. A DFL is used on the back surface of each segment in the Sweatt approximation in order to achromatize and optimize each ring separately. Although the design software is useful for the geometrical design, it may not account for the physical optics of the real lens. Custom software may be used that combines real ray tracing with physical optics propagation to model focal plane irradiance as a function of defocus and wavelength, for example. As a further example, custom software may be used to determine detailed tolerancing for fabrication and alignment.

The following fabrication plan for individual segments combines diamond turning of molds and compression molding of low-temperature glass. However, this is an illustrative example and other fabrication may be used. First, molds are rough machined from Stavax or Invar blanks and electroplated with nickel at a vendor machine shop. Then, the nickel plating on the front and back surfaces are directly diamond turned by an experienced technician using our in-house Moore Nanotech 350FG freeform generator. The off-axis lens segment mold is designable and fabricated so that the molded segments can fit side-by-side with their neighbors during alignment by incorporating alignment features in the mold. The MODE segment boundaries may be used as position references for alignment. The segments are made from a low-temperature glass—such as Schott N-PK51—that is compression molded with our in-house Moore Nanotech 140GPM precision glass molding machine. During the molding process, the top and bottom mold halves will be aligned to each other by a centering collar and an alignment feature, such as a set of pins or an alignment slot. The mold profile may be measured in various manners. As an example, the mold profile may be measured using a Zygo interferometer and white-light surface profilometer to verify the mold shape. The measured data is usable to verify the prescribed form. The molds will be fine-tuned again with an adjusted toolpath based on measurement data to correct for any deviation from the lens prescription, prior to replication of the final telescope lens segments. For each top-and-bottom mold pair, molding parameters may be configured or optimized, such as for pressure and temperature versus time. Several iteration cycles may be used to optimize molding conditions. A possible issue with the compression molding approach is under-filling the corners at an A-B-B intersection, as shown in FIG. 1, or at a B-B-edge corner. FEA analysis may be used in order to assist in defining optimal substrate and mold shapes and molding parameters.

Several PMMA segments may be direct diamond turned in order to provide working models for the KEYS alignment technique (described more fully below). These segments may be the same size and basic shape as the glass segments.

The color corrector optical elements may mostly be fabricated by prescribing detailed engineering drawings and having the lenses made at a custom lens facility (e.g., such as Optimax, Inc.). There are only two custom elements that must be fabricated with our equipment. One is the MODE corrector surface, and the second is a phasing corrector that may not be necessary when the KEYS alignment works. The phasing corrector may be placed at the conjugate plane to the MODE primary lens inside the color corrector group, just before the MODE corrector surface.

In view of potential roadblocks in an initial fabrication plan, alternative MODE lens fabrication technologies are considered. Although processes have been identified for compression molding diffractive features, the combination of both large step height on the MOD surface and small step height on the DFL surface requires iterative process optimization.

The DFL achromatizing back surface of the MODE lens can also be fabricated by PDMS replication, rather than by molding. In this alternate process flow, a flat surface is molded as the back of a segment, rather than the DFL. First, a DFL master is diamond turned in an aluminum substrate. Then, a PDMS mold is made of the master. Finally, the master is replicated onto the back surface of the segment with NOA61 UV curing adhesive. PI Milster's group has several years of experience in replicating diffractive optics with this technique. FIG. 4 shows an example plastic MODE lens and DFL back surface fabricated with this replication technique, rather than direct diamond turning the plastic MODE lens substrate. As opposed to making adequate feature fidelity with compression molding, the challenges change to alignment of the replica and the MOD front surface. The DFL focal length is very long (~10 m), so alignment sensitivity is not a primary concern.

Kinematically Engaged Yoke System (KEYS)

MODE lens segments may be aligned and bonded together to form the primary lens shown in FIG. 1. Errors in the alignment create aberrations in the optical system that degrade performance and therefore inhibit the science. Meeting the alignment and co-phasing target specifications is one of the most critical factors to ensure the final performance of the MODE lens system.

Segment alignment also includes co-phasing, because segmented MODE lens surfaces are not strictly continuous. There are ~500-µm gaps between each segment due to tolerances of the fabrication process and welding process margin. In order for the wavefront transmitted through the MODE lens to be in phase across the aperture diameter, each segment must sample the parent optical surface at exactly the correct location and orientation.

Figure 5A:
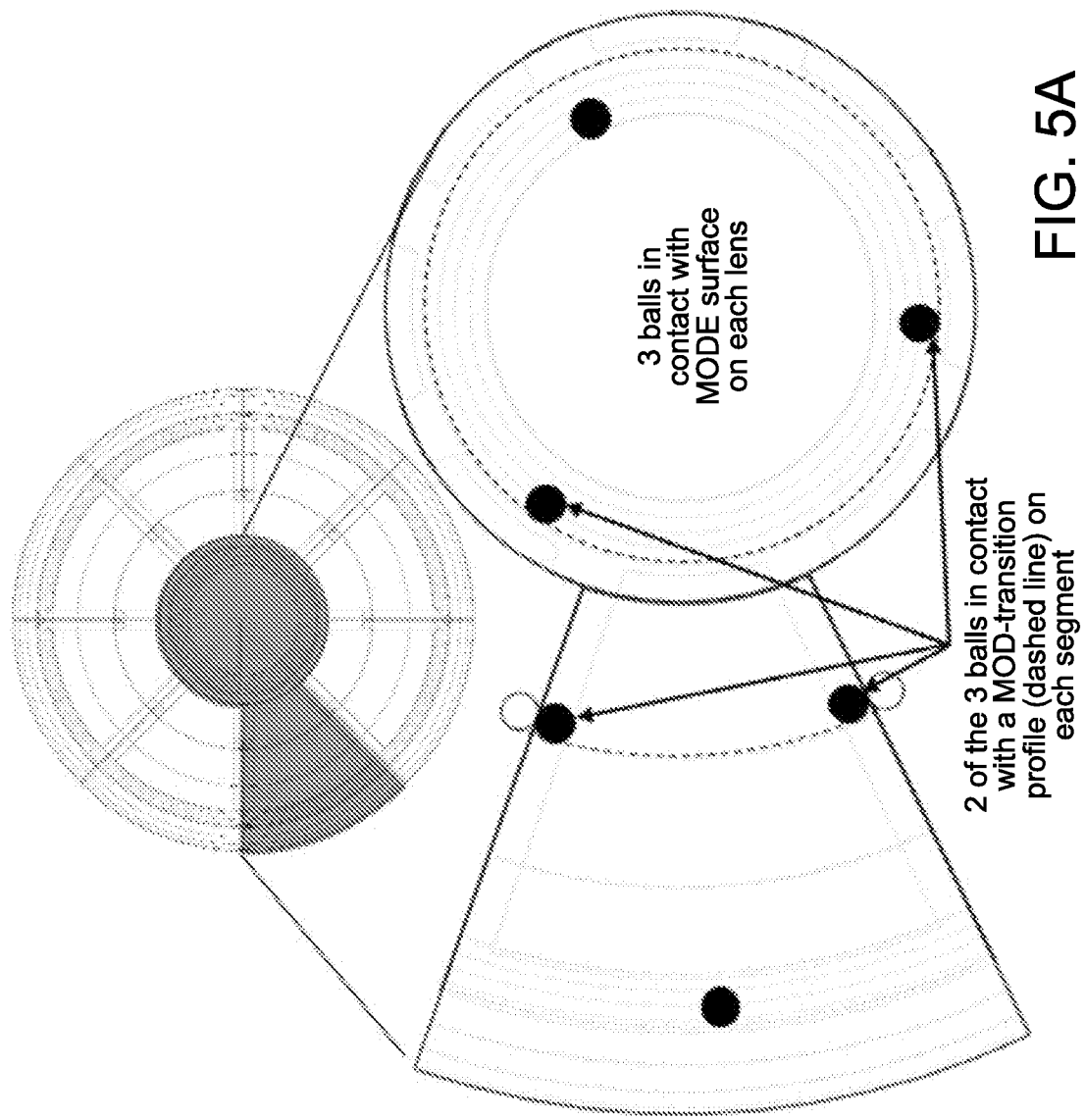
Figure 6:
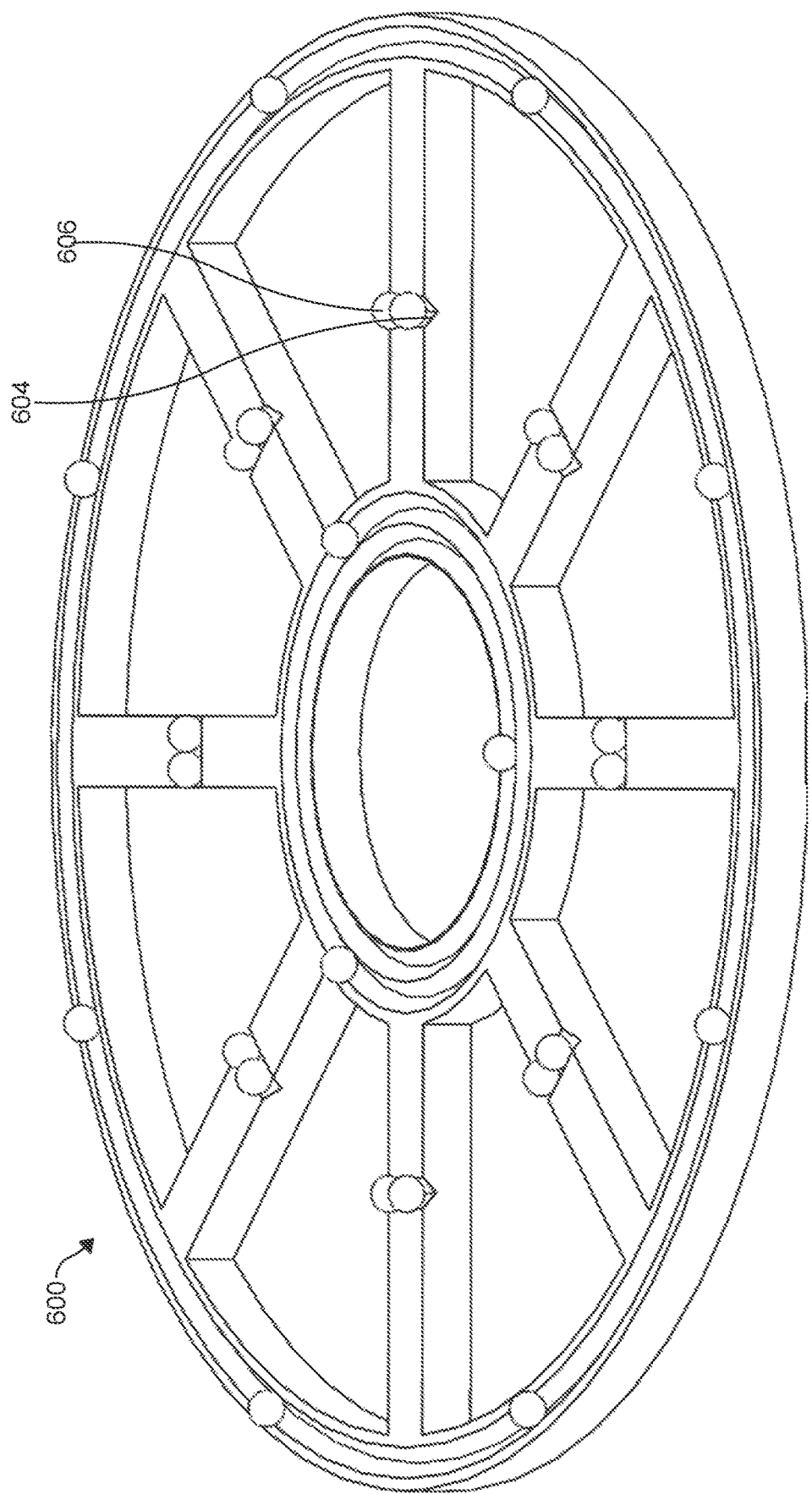
FIGS. 6-7 are diagrams illustrating V-grooves and balls to define the kinematic supporting points of KEYS according to exemplary embodiments of the present disclosure.
Figure 7:
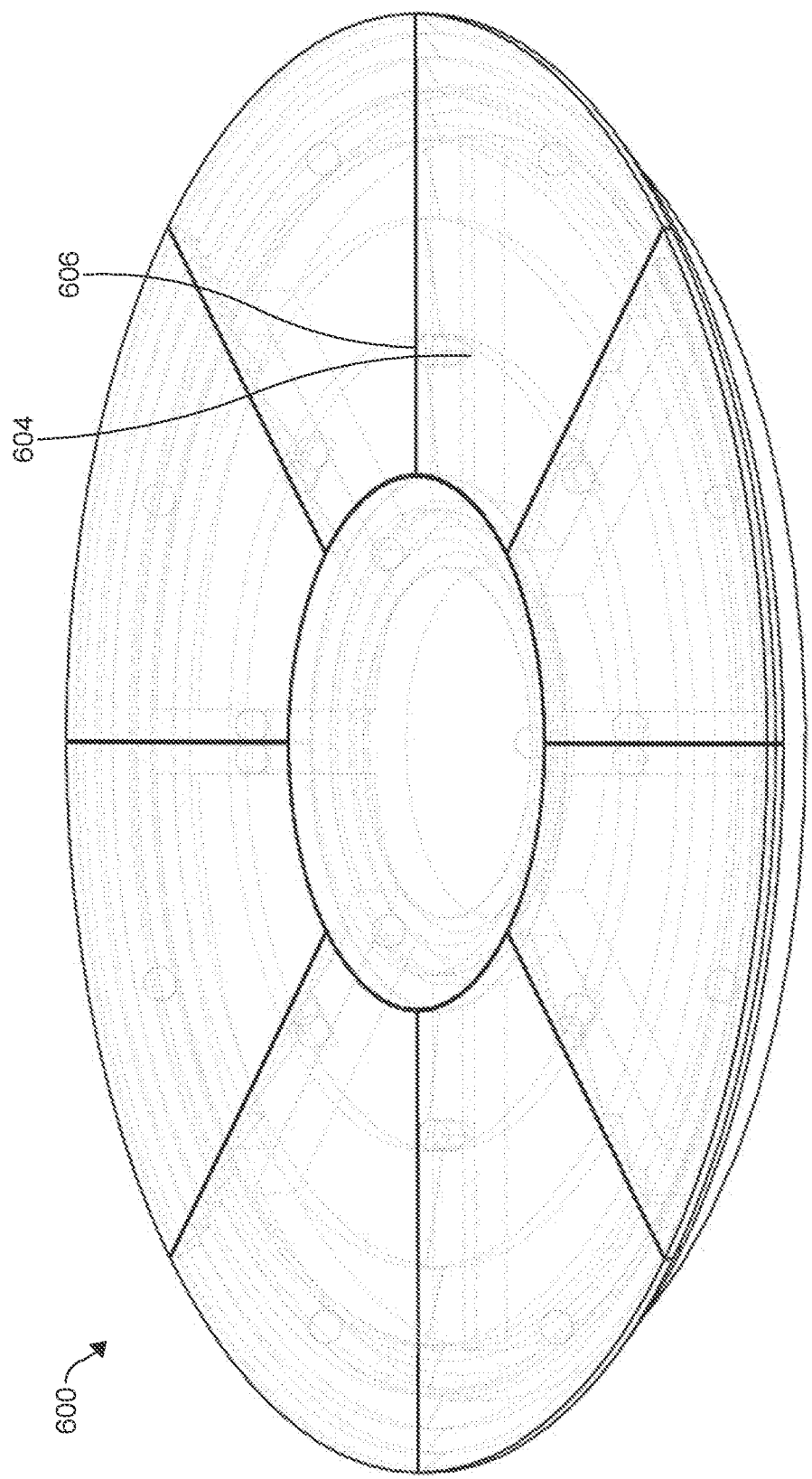
Figure 8:
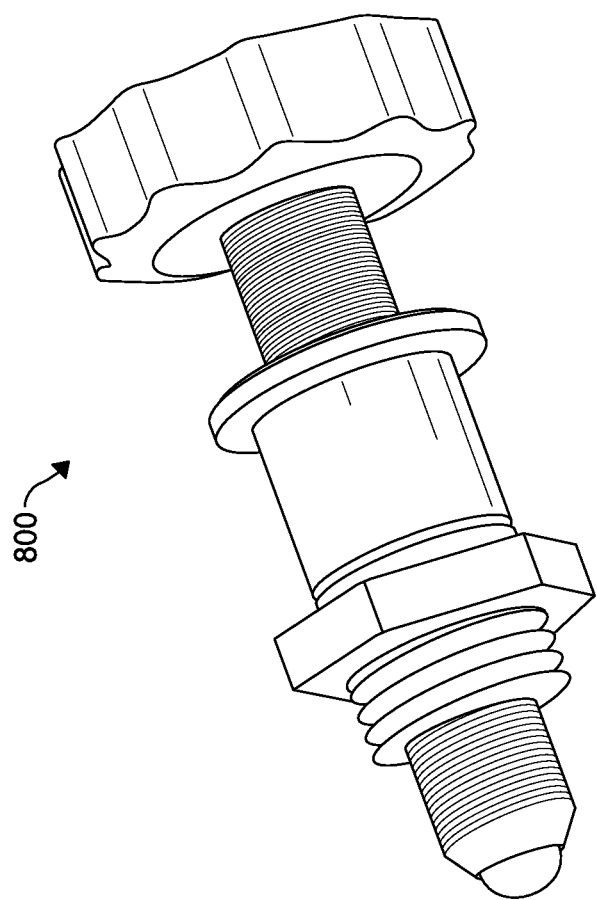
FIG. 8 is a diagram illustrating adjustment screws which may replace the balls in order to provide adjustment capability to the KEYS.

The Kinematically Engaged Yoke System (KEYS) 500 is shown in FIGS. 5A, 5B, and 5C, which utilizes the intrinsic surface profiles of MODE segments 502. KEYS may comprise a harness 501 comprising negatively shaped semi-kinematic "keys" 504 which fit to the MOD-side step-like mechanical profile manufactured with optical precision. The step-like optical surface features function as fiducials that provide alignment between neighboring segments 502 to optical precision, enabled by diamond turning the harness 501 with the same instrument used to fabricate the MODE molds. The semi-kinematic mounting points 504 may comprise high-precision balls 506 embedded in the KEYS structure. KEYS will provide a self-aligning structure meeting the MODE primary lens alignment tolerances. FIGS. 6 and 7 show schematic drawings illustrating the V-grooves 604 and spherical elements or balls 606 to define the kinematic supporting points of KEYS 600. Depending on the specific alignment need, lens segment's optical surface profile, and controlling degrees of freedom, the ball locations may be set differently. (The high-precision balls can be replaced with precision adjustment screws with sub-micron sensitivity, as shown in FIG. 5. In this regard, FIG. 8 shows example adjustment screws 800, which may replace the balls in order to provide adjustment capability to the KEYS. In this regard, the balls may have moving/adjusting capability.)

The present disclosure comprises at least the following aspects:

Aspect 1: A kinematically engaged yoke system (KEYS) for multiple-order-diffraction engineered material, the system comprising: a harness comprising a frame and a plurality of semi-kinematic keys disposed on the frame, wherein the semi-kinematic keys are configured based on a MOD-side mechanical profile of a plurality of segments of a multiple-order-diffraction engineered material, and wherein the MOD-side mechanical profile, when engaged with the semi-kinematic keys, functions as a fiducial that provides alignment between neighboring segments.

Aspect 2: The system of aspect 1, wherein the semi-kinematic keys comprise balls at least partially embedded in frame.

Aspect 3: The system of any of aspects 1-2, wherein the semi-kinematic keys comprise adjustable mounting mechanisms configured to allow movement of the keys along at least one axis.

Aspect 4: The system of any of aspects 1-3, wherein frame comprises a plurality of troughs or detents, and wherein one or more of the semi-kinematic keys are disposed in the troughs or detents.

Aspect 5: The system of any of aspects 1-4, wherein the frame comprises a hub and a plurality of spokes extending radially outwardly from the hub.

Aspect 6: The system of any of aspects 1-5, wherein the MOD-side mechanical profile comprises a step-like optical surface that, when engaged with the semi-kinematic keys functions as fiducials that provide alignment between neighboring segments to optical precision.

Aspect 7: A registration system comprising: an optical device having a plurality of discrete segments formed from multiple-order-diffraction engineered material; a harness comprising a frame and a plurality of semi-kinematic keys disposed on the frame, wherein the semi-kinematic keys are configured based on a MOD-side mechanical profile of the optical device, and wherein the MOD-side mechanical profile, when engaged with the semi-kinematic keys, functions as a fiducial that provides alignment between neighboring segments.

Aspect 8: The system of aspect 7, wherein the semi-kinematic keys comprise balls at least partially embedded in frame.

Aspect 9: The system of any of aspects 7-8, wherein the semi-kinematic keys comprise adjustable mounting mechanisms configured to allow movement of the keys along at least one axis.

Aspect 10: The system of any of aspects 7-9, wherein frame comprises a plurality of troughs or detents, and wherein one or more of the semi-kinematic keys are disposed in the troughs or detents.

Aspect 11: The system of any of aspects 7-10, wherein the frame comprises a hub and a plurality of spokes extending radially outwardly from the hub.

Aspect 12: The system of any of aspects 7-11, wherein the MOD-side mechanical profile comprises a step-like optical surface that, when engaged with the semi-kinematic keys functions as fiducials that provide alignment between neighboring segments to optical precision.

Aspect 13: A method of making the system of any one of aspects 1-12.

Aspect 14: A method of using the system of any one of aspects 1-12.

Testing and verifying of the MODE lens segments aligned by KEYS may be by using interferometric and deflectometric metrology systems. By imaging the precisely aligned concentric and visible ring structures on the MOD-side optical surfaces, measurements of the initial coarse alignment status by an image recognition method may be obtained. The baseline is a dark-field illumination on the surface, where a high-contrast camera image is obtained from scattering off sharp edges of the MOD transitions. The concentric ring images will guide the initial alignment of the segments. Once coarse alignment is verified and confirmed, more precise fine alignment metrology may be applied using our sheared Fourier multi-segment alignment technology to precisely characterize and confirm the as-assembled MODE lens segment alignment accuracy set by KEYS. This multi-segment alignment system uses a 2D sinusoidal pattern displayed on a screen, where the reflected pattern is captured by a camera. By collecting sequential images and computing a Fourier transform of the difference in the initial image to the current image, the tip and tilt alignment of each segment may be determined (e.g., in real-time). The co-phasing achieved by KEYS may be tested using a Bruker Nano NT9800 whitelight interferometer that measures the MOD-side of two adjacent segments in a single field of view. By using the Vertical Scanning Interferometry (VSI) mode of the whitelight interferometry, it may be ensured: 1) no ambiguity in measuring the absolute height difference between the segments over the gap (i.e., ~500 µm); and 2) the exact co-phasing of the segment is controlled and achieve.

Figure 9:
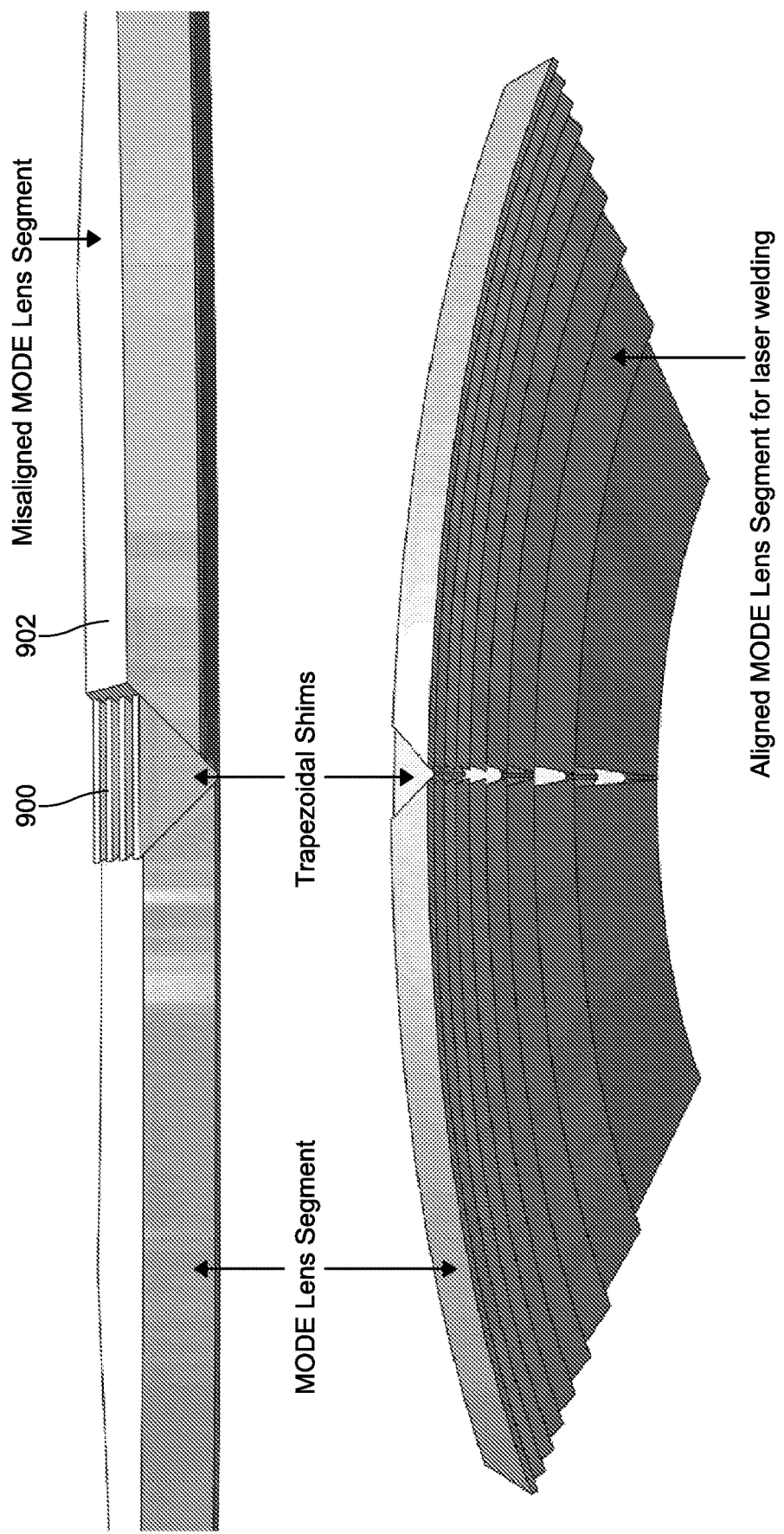
FIG. 9 is a diagram illustrating trapezoidal shims connecting MODE lens segments according to an exemplary embodiment of the present disclosure.
Figure 10:
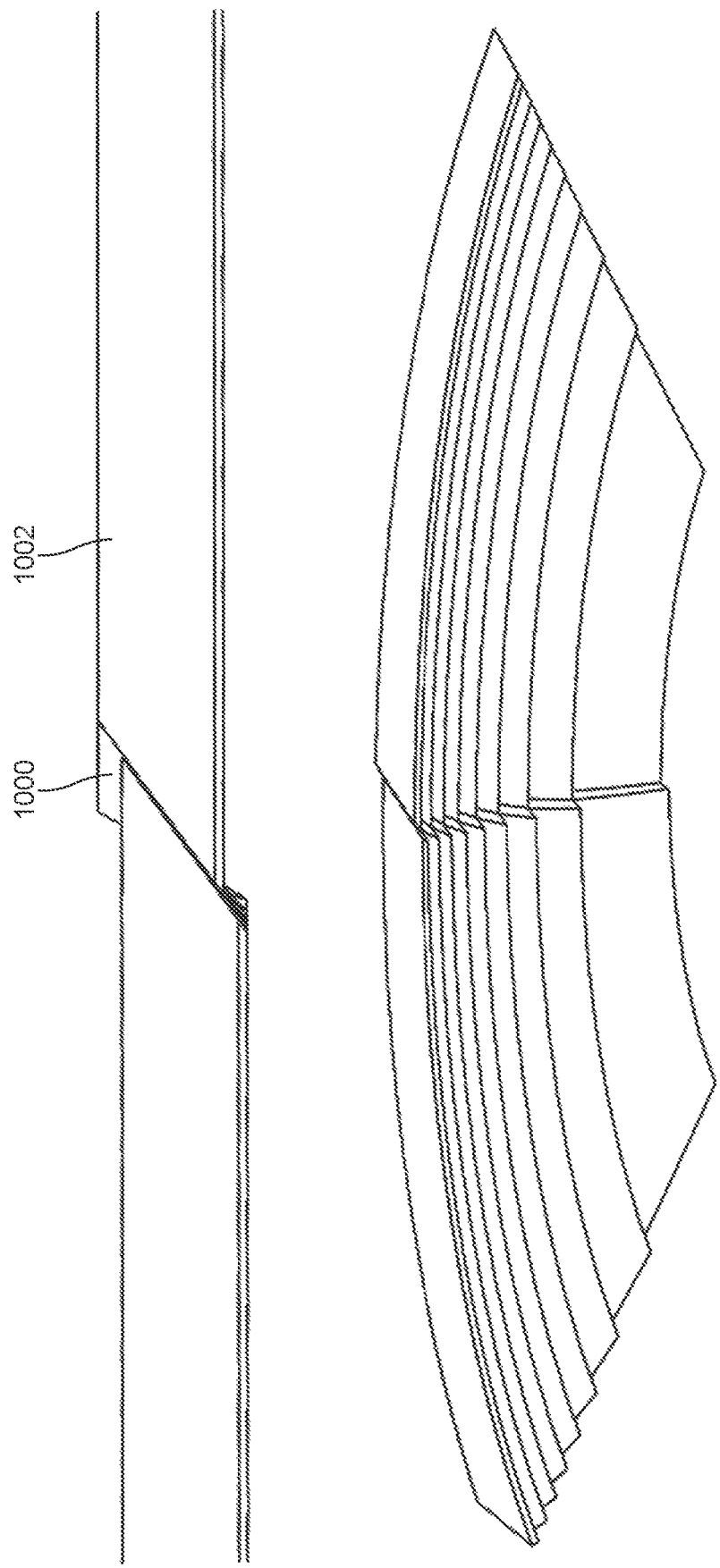
FIGS. 10-12 are diagram illustrating shims connecting MODE lens segments according to other exemplary embodiments of the present disclosure.
Figure 11:
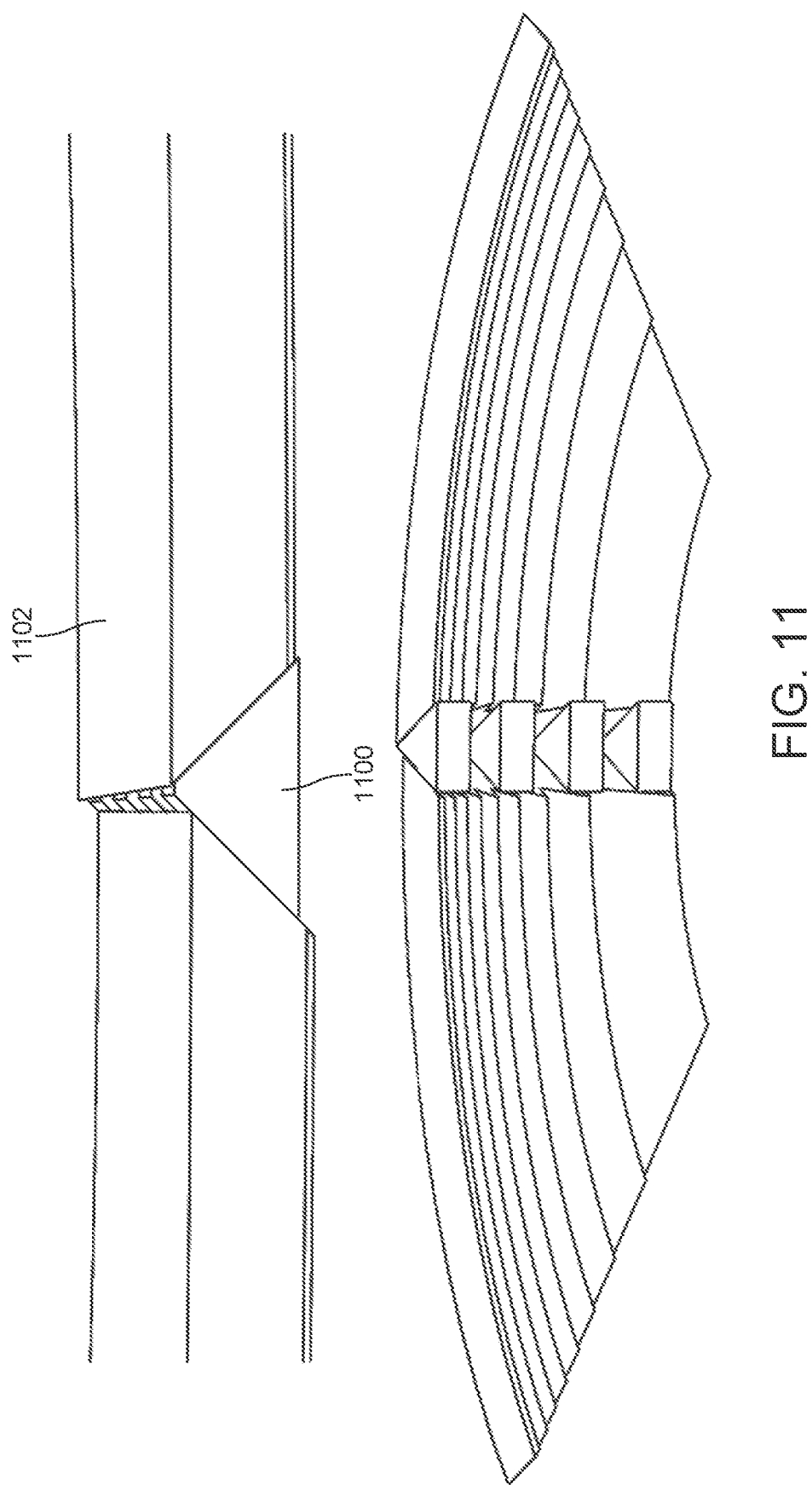
Figure 12:
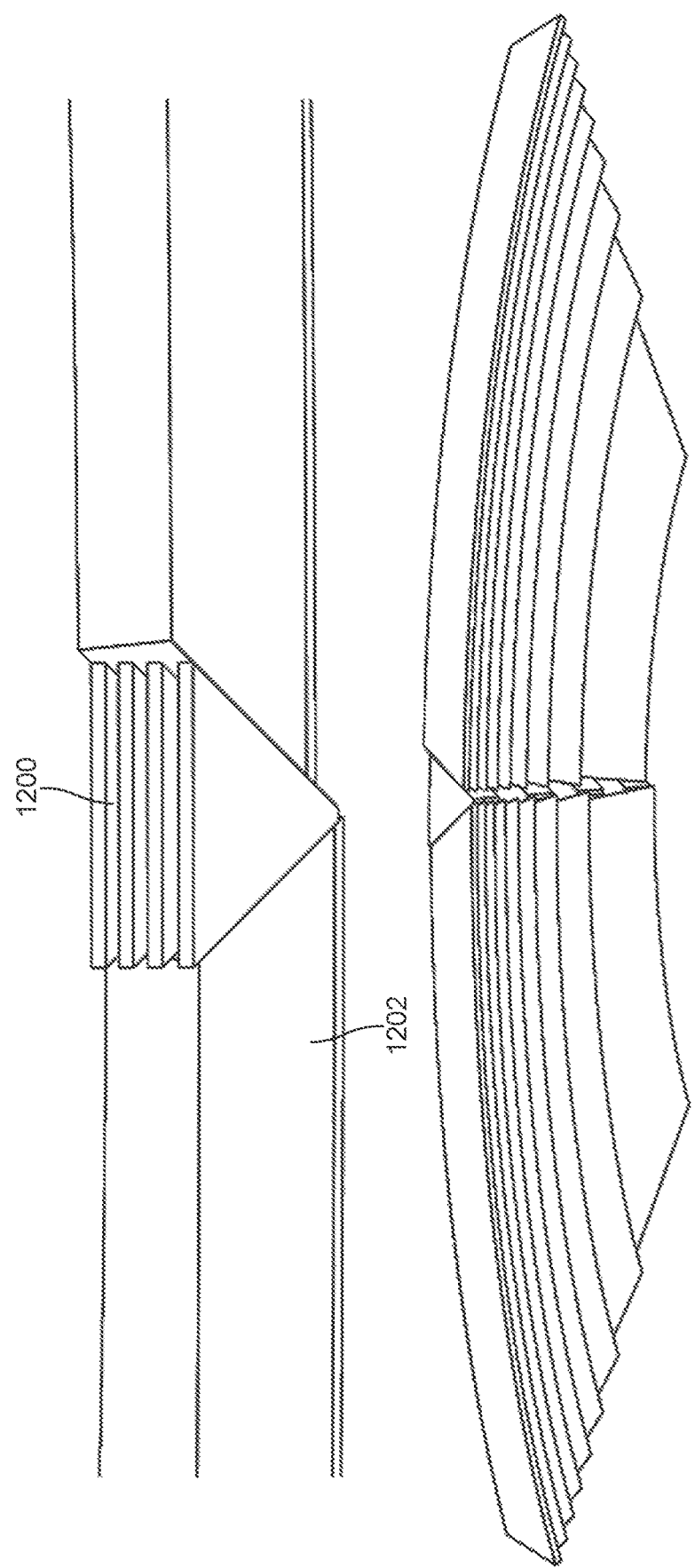
Figure 13:
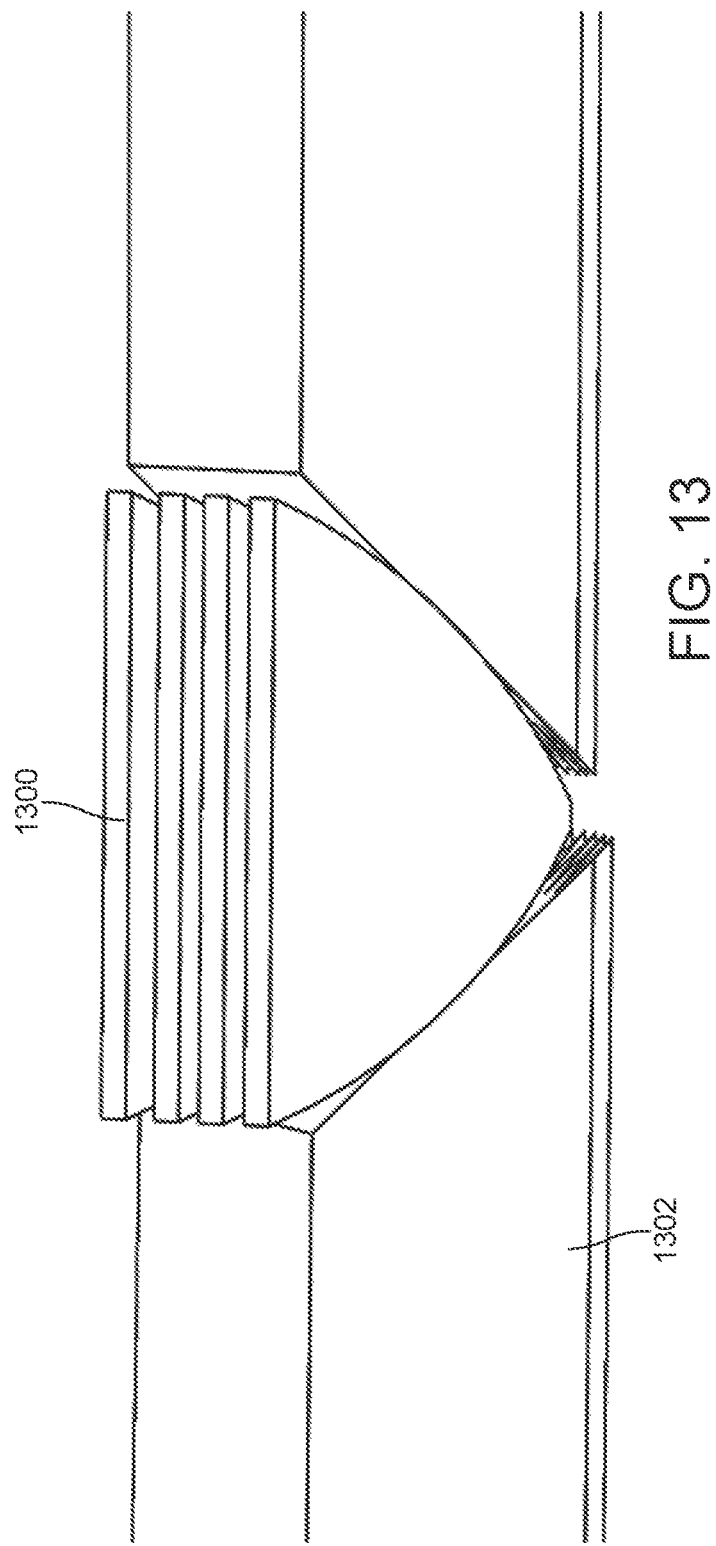
FIG. 13 is a diagram illustrating rounded shims connecting MODE lens segments according to an exemplary embodiment of the present disclosure.

Once the MODE segments are fully aligned, femtosecond laser welding may be used while the KEYS structure maintains the alignment. In order to create physical contact areas between the MODE lens segments 902, a trapezoidal shim 900 with very long radius of curvature sides may be applied, as shown in FIG. 9. FIGS. 10-12 are diagram illustrating shims 1000, 1100, 1200 connecting MODE lens segments 1002, 1102, 1202 according to other exemplary embodiments of the present disclosure. FIG. 13 is a diagram illustrating rounded shims 1300 connecting MODE lens segments 1302 according to an exemplary embodiment of the present disclosure. The shims 900, 1000, 1100, 1200, 1300 may be configured to fit in the gaps between segments without introducing excessive stress or misalignments (see e.g., FIGS. 10-12). Shims may provide physical contact areas where the laser beam is focused for welding that merges the segments at multiple shim locations. Hence, the segments are physically joined without causing misalignment during the bonding process. (If there are any unexpected issues with the laser beam welding approach, adhesive bonding may be applied). FIG. 13 shows a rounded shim feature 1300, which may create a line (or point when it is curved in both directions like a sphere) contact with the lens segments instead of a plane contact. FIGS. 14 and 15 illustrate top and bottom mold segment pairs 1402, 1502 that are aligned to each other by a centering notch 1400, 1500 (i.e., aligned via a notch). The trapezoidal shims may be used in concert with the notch approach and may prevent misalignment during the merging process. The various configurations of the shims may be used to adjust position of neighboring segments to facilitate alignment for welding or otherwise coupling segments to each other.

The present disclosure comprises at least the following aspects:

Aspect 1: A kinematically engaged yoke system (KEYS) for multiple-order-diffraction engineered material, the system comprising: a harness comprising a frame and a plurality of semi-kinematic keys disposed on the frame, wherein the semi-kinematic keys are configured based on a MOD-side mechanical profile of a plurality of segments of a multiple-order-diffraction engineered material, and wherein the MOD-side mechanical profile, when engaged with the semi-kinematic keys, functions as a fiducial that provides alignment between neighboring segments; and one or more shims disposed between one or more pairs of neighboring segments of the plurality of segments of the multiple-order-diffraction engineered material, wherein the one or more shims facilitate alignment of the one or more pairs of neighboring segments of the plurality of segments based on a translation across one or more surfaces of the one or more shims.

Aspect 2: The system of aspect 1, wherein the semi-kinematic keys comprise balls at least partially embedded in frame.

Aspect 3: The system of any one of aspects 1-2, wherein the semi-kinematic keys comprise adjustable mounting mechanisms configured to allow movement of the keys along at least one axis.

Aspect 4: The system of any one of aspects 1-3, wherein frame comprises a plurality of troughs or detents, and wherein one or more of the semi-kinematic keys are disposed in the troughs or detents.

Aspect 5: The system of any one of aspects 1-4, wherein the frame comprises a hub and a plurality of spokes extending radially outwardly from the hub.

Aspect 6: The system of any one of aspects 1-5, wherein the MOD-side mechanical profile comprises a step-like optical surface that, when engaged with the semi-kinematic keys functions as fiducials that provide alignment between neighboring segments to optical precision.

Aspect 7: The system of any one of aspects 1-6, wherein the one or more shim have a generally trapezoidal cross-section.

Aspect 8: The system of any one of aspects 1-7, wherein the one or more shim have a generally triangular cross-section.

Aspect 9: The system of any one of aspects 1-8, wherein the one or more shim have a generally curvilinear surface configured to abut a portion of each of the one or more pairs of neighboring segments of the plurality of segments.

Aspect 10: A registration system comprising: an optical device having a plurality of discrete segments formed from multiple-order-diffraction engineered material, each of the discrete segments have a beveled edge configured to be disposed adjacent the beveled edge of a neighboring one of the discrete segments; and a harness comprising a frame and a plurality of semi-kinematic keys disposed on the frame, wherein the semi-kinematic keys are configured based on a MOD-side mechanical profile of the optical device, wherein the MOD-side mechanical profile, when engaged with the semi-kinematic keys, functions as a fiducial that provides alignment between neighboring segments, and wherein the beveled edges of the discrete segments facilitates positioning of the discrete segments relative to each other to effect alignment between the discrete segments.

Aspect 11: The system of aspect 10, further comprising one or more shims disposed between one or more pairs of neighboring segments of the plurality of segments of the multiple-order-diffraction engineered material and abutting corresponding beveled edges of the neighboring segments, wherein the one or more shims facilitate alignment of the one or more pairs of neighboring segments of the plurality of segments based on a translation across one or more surfaces of the one or more shims.

Aspect 12: The system of aspect 11, wherein the one or more shim have a generally trapezoidal cross-section.

Aspect 13: The system of aspect 11, wherein the one or more shim have a generally triangular cross-section.

Aspect 14: The system of aspect 11, wherein the one or more shim have a generally curvilinear surface configured to abut a portion of each of the one or more pairs of neighboring segments of the plurality of segments.

Aspect 15: The system of any one of aspects 10-14, wherein the semi-kinematic keys comprise balls at least partially embedded in frame.

Aspect 16: The system of any one of aspects 10-15, wherein the semi-kinematic keys comprise adjustable mounting mechanisms configured to allow movement of the keys along at least one axis.

Aspect 17: The system of any one of aspects 10-16, wherein frame comprises a plurality of troughs or detents, and wherein one or more of the semi-kinematic keys are disposed in the troughs or detents.

Aspect 18: The system of any one of aspects 10-17, wherein the frame comprises a hub and a plurality of spokes extending radially outwardly from the hub.

Aspect 19: The system of any one of aspects 10-18, wherein the MOD-side mechanical profile comprises a step-like optical surface that, when engaged with the semi-kinematic keys functions as fiducials that provide alignment between neighboring segments to optical precision.

Aspect 20: A method of making the system of any one of aspects 10-19.

Aspect 21: A method of using the system of any one of aspects 10-19.

Aspect 22: A registration system comprising: an optical device having a plurality of discrete segments formed from multiple-order-diffraction engineered material, each of the discrete segments have a beveled edge configured to be disposed adjacent the beveled edge of a neighboring one of the discrete segments; and one or more shims disposed between one or more pairs of neighboring segments of the plurality of segments of the multiple-order-diffraction engineered material and abutting corresponding beveled edges of the neighboring segments, wherein the one or more shims facilitate alignment of the one or more pairs of neighboring segments of the plurality of segments based on a translation across one or more surfaces of the one or more shims.

MODE lenses may be fabricated by increasing the mold diameter with a custom diamond turning machine. The Y axis of our 140GPM instrument can be increased an additional 200 mm to provide a maximum turning diameter of 1 m. Coupled with a 1-m diameter compression molding machine, the increased mold diameter will produce monolithic 1-m singlets or segments.

Furthermore, mold segments may be configured and aligned with KEYS-like technology and welded into a single, large-aperture mold, allowing molding and replicating of monolithic MODE lenses from a segmented mold.

Such monolithic MODE lenses would further reduce the structural complexity, risk, and fabrication costs of replicated MODE lenses. For example, a 5-m diameter fourth-generation singlet could be produced from only 3 unique molds and 25 mold segments. A 3-m diameter telescope will only require 2 unique molds and 9 mold segments.

If segmented molds are utilized, it may be beneficial to allow some small spacing between segments in order to fabricate a rib structure in the resulting singlet. As discussed in section 6, the rib structure would be advantageous in a space environment.

For the foreseeable future, launch vehicles are limited to a maximum diameter of about 5 m, and several 5 m MODE systems can be launched in a single payload. When it becomes feasible in space conditions, 5-m segments could be combined for larger apertures. For terrestrial telescopes, procedures similar to those developed here could be used to fabricate ultra-large segmented aperture telescopes.

Revolutionizing Space Observatories

Future space observatories based on MODE lenses hold the promise of ushering in a revolutionary change in astronomy, Earth, and planetary science. The revolution's foundation is the proliferation of large-aperture telescopes. MODE lens technology represents a leap forward in reducing mass and volumetric needs and thus enables highly cost-efficient telescope systems. This quantum leap in cost, mass and volume efficiency makes much large apertures realizable to organizations ranging from universities to start-ups: for example, it may bring about an era when groups of universities may operate their own Kepler- or Hubble-sized space telescopes.

MODE lens technology provides scalable, relatively low-cost, low-weight, and high-quality optical elements. MODE technology may be rapidly adopted in other, non-astronomical applications, including the following examples: 1) Long-distance optical space-to-space and ground-to-space communication, where short pulses of relatively weak intensity can be picked up from large distances; and 2) Rapidly deployable, low-weight, large-aperture small satellites, possibly utilizing unfolding MODE-based lenses. For example, multiple rapidly-deployed LEO SmallSats equipped with multiple low-weight MODE lenses could provide simultaneous multi-spectral imaging (from near-UV to thermal infrared) to continuously monitor individual disaster areas. 3) Large ground-based telescope arrays: MODE lenses would allow uniquely large, multi-telescope ground-bases telescopes, providing simultaneous, wide-field of view imaging capability. For example, eight large MODE-lens based telescopes may be mounted on a fixed geodesic dome (each pointing in different directions), providing uniquely wide field imaging of the northern sky (possibly complementing the southern LSST telescope). Other commercial applications, like cell phone camera MODE lenses and MODE solar energy collectors, may be utilized.

Many modifications and other embodiments of the present disclosures set forth herein will come to mind to one skilled in the art to which these present disclosures pertain having the benefit of the teachings presented in the foregoing descriptions and the associated drawings. Therefore, it is to be understood that the present disclosures are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed:

1. A kinematically engaged yoke system (KEYS) for a multiple-order-diffraction engineered material, the system comprising:
    a harness comprising a frame and a plurality of semi-kinematic keys disposed on the frame,
    wherein the semi-kinematic keys are configured based on a multiple-order diffractive (MOD)-side mechanical profile of a plurality of segments of the multiple-order-diffraction engineered material, and
    wherein the MOD-side mechanical profile, when engaged with the semi-kinematic keys, functions as a fiducial that provides alignment between neighboring segments.

2. The system of claim 1, further comprising one or more shims disposed between one or more pairs of neighboring segments of the plurality of segments of the multiple-order-diffraction engineered material, wherein the one or more shims facilitate alignment of the one or more pairs of neighboring segments of the plurality of segments based on a translation across one or more surfaces of the one or more shims.

3. The system of claim 2, wherein the one or more shims have a generally trapezoidal cross-section.

4. The system of claim 2, wherein the one or more shims have a generally triangular cross-section.

5. The system of claim 2, wherein the one or more shims have a generally curvilinear surface configured to abut a portion of each of the one or more pairs of neighboring segments of the plurality of segments.

6. The system of claim 1, wherein the semi-kinematic keys comprise balls at least partially embedded in the frame.

7. The system of claim 1, wherein the semi-kinematic keys comprise adjustable mounting mechanisms configured to allow movement of the semi-kinematic keys along at least one axis.

8. The system of claim 1, wherein the frame comprises a plurality of troughs or detents, and wherein one or more of the semi-kinematic keys are disposed in the troughs or detents.

9. The system of claim 1, wherein the frame comprises a hub and a plurality of spokes extending radially outwardly from the hub.

10. The system of claim 1, wherein the MOD-side mechanical profile comprises a step-like optical surface that, when engaged with the semi-kinematic keys functions as fiducials that provide alignment between neighboring segments to optical precision.

11. A registration system comprising:
    an optical device having a plurality of discrete segments formed from a multiple-order-diffraction engineered material; and
    a harness comprising a frame and a plurality of semi-kinematic keys disposed on the frame, wherein the semi-kinematic keys are configured based on a multiple-order diffractive (MOD)-side mechanical profile of the optical device, wherein the MOD-side mechanical profile, when engaged with the semi-kinematic keys, functions as a fiducial that provides alignment between neighboring segments.

12. The system of claim 11, wherein each of the discrete segments has a beveled edge configured to be disposed adjacent the beveled edge of a neighboring one of the discrete segments, and wherein the beveled edges of the discrete segments facilitate positioning of the discrete segments relative to each other to effect alignment between the discrete segments.

13. The system of claim 11, further comprising one or more shims disposed between one or more pairs of neighboring segments of the plurality of segments of the multiple-order-diffraction engineered material and abutting corresponding beveled edges of the neighboring segments, wherein the one or more shims facilitate alignment of the one or more pairs of neighboring segments of the plurality of segments based on a translation across one or more surfaces of the one or more shims.

14. The system of claim 13, wherein the one or more shims have a generally trapezoidal cross-section.

15. The system of claim 13, wherein the one or more shims have a generally triangular cross-section.

16. The system of claim 13, wherein the one or more shims have a generally curvilinear surface configured to abut a portion of each of the one or more pairs of neighboring segments of the plurality of segments.

17. The system of claim 11, wherein the semi-kinematic keys comprise balls at least partially embedded in the frame.

18. The system of claim 11, wherein the semi-kinematic keys comprise adjustable mounting mechanisms configured to allow movement of the semi-kinematic keys along at least one axis.

19. The system of claim 11, wherein the frame comprises a plurality of troughs or detents, and wherein one or more of the semi-kinematic keys are disposed in the troughs or detents.

20. A registration system comprising:
an optical device having a plurality of discrete segments formed from a multiple-order-diffraction engineered material, each of the discrete segments has a beveled edge configured to be disposed adjacent the beveled edge of a neighboring one of the discrete segments; and
one or more shims disposed between one or more pairs of neighboring segments of the plurality of segments of the multiple-order-diffraction engineered material and abutting corresponding beveled edges of the neighboring segments, wherein the one or more shims facilitate alignment of the one or more pairs of neighboring segments of the plurality of segments based on a translation across one or more surfaces of the one or more shims.

* * * * *